W. E. NICKLAUS.
BACKREST FOR FARM MACHINERY.
APPLICATION FILED MAR. 26, 1921.
1,388,291.
Patented Aug. 23, 1921.
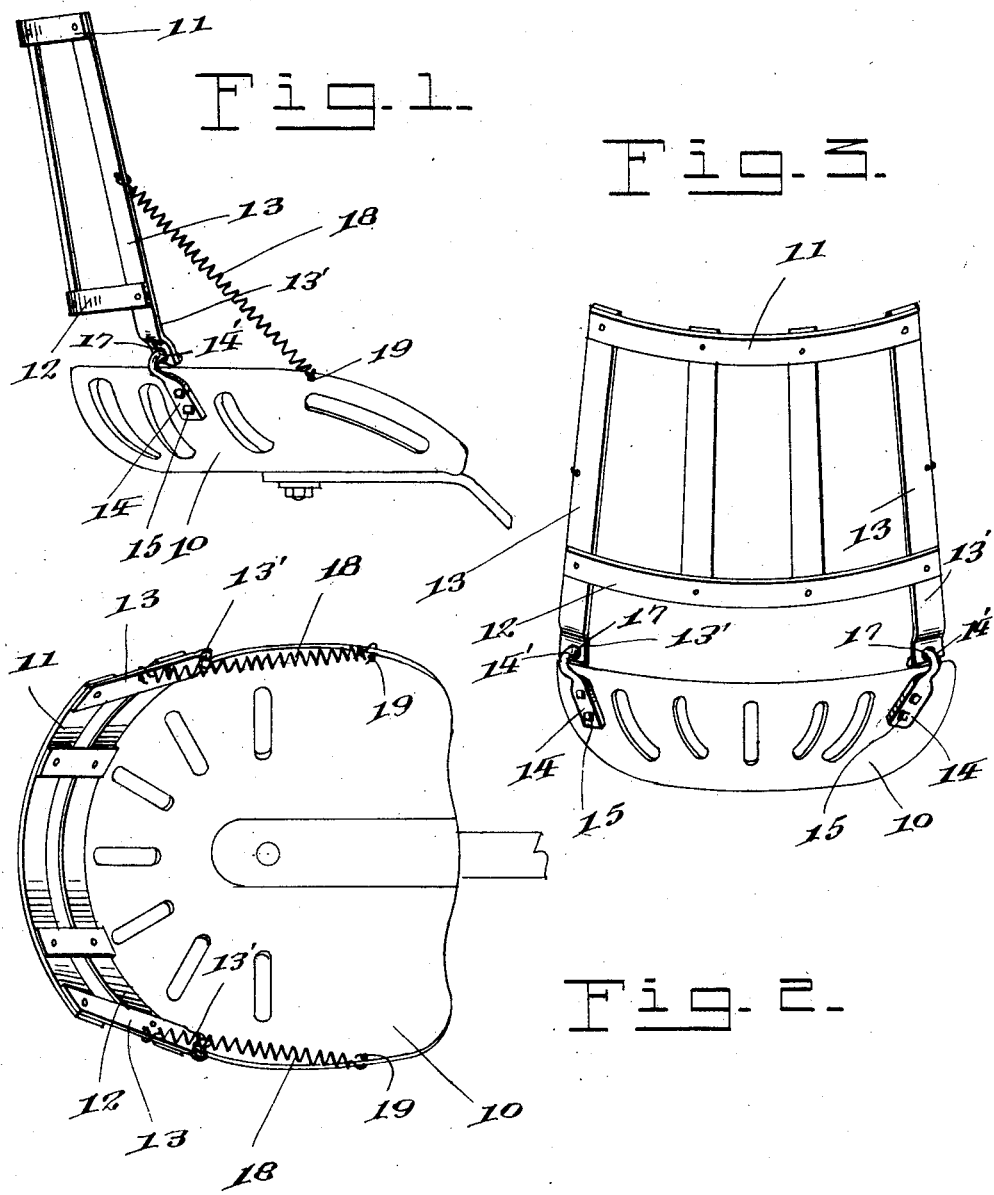

UNITED STATES PATENT OFFICE.

WILLIAM E. NICKLAUS, OF MADISON, INDIANA.

BACKREST FOR FARM MACHINERY.

1,388,291. Specification of Letters Patent. Patented Aug. 23, 1921.

Application filed March 26, 1921. Serial No. 455,842.

*To all whom it may concern:*

Be it known that I, WILLIAM E. NICKLAUS, a citizen of the United States, residing at Madison, in the county of Jefferson, State of Indiana, have invented certain new and useful Improvements in Backrests for Farm Machinery; and I do hereby declare the following to be a full, clear, and exact description of the invention, such as will enable others skilled in the art to which it appertains, to make and use the same.

This invention relates to new and useful improvements in back rests and particularly to back rests for the seats of farm machinery and implements, as well as tractors.

One object of the invention is to provide a back rest which can be easily and quickly attached to the seat of the farm machine, and which will be comfortable for the person.

Another object is to provide a back rest which is simple in construction and which can be manufactured at a low cost.

Other objects and advantages will be apparent from the following description when taken in connection with the accompanying drawing.

In the drawing:

Figure 1 is a side elevation of the invention applied to the seat of a farm machine.

Fig. 2 is a top plan view of the same.

Fig. 3 is a rear elevation of the same.

Referring particularly to the accompanying drawing, 10 represents the seat of a farm machine in connection with which the invention is applied.

The back rest includes the upper horizontal curved strip 11, the lower curved strip 12, and the vertical strips 13 connected to the strips 11 and 12. The strip 11 is preferably shorter than the strip 12, the former strip being curved to conform to the curvature of the back of the user, while the lower strip 12 is curved to conform to the rear curvature of the seat 10. Thus the upper end of the back rest is not as wide as the lower end, and by reason of the fact that the lower strip 12 is longer than the upper strip 11, its ends extend a short distance forwardly at the sides of the seat, with the result that the outer side vertical strips 13, incline downwardly and forwardly from the upper strip 11 to the lower strip 12, and beyond said lower strip to the side of the seat. Secured to the sides of the seat are the members 14, each formed from a single piece of metal doubled on itself to form the terminal eye portion 14', and which members are apertured to receive the securing bolts 15, passed through the seat. The lower ends 13' of the side strips 13 are apertured at 17 and the eye members 14' engaged therethrough. Connected to the intermediate portion of each of the strips or arms 13 is one end of a coil spring 18, the other end of which is secured to the side of the seat 10, forwardly of the member 14, through the opening 19.

By reason of the pivotal connections between the members 13 and the members 14, the back rest may move backwardly and forwardly with the movements of the sitter, the springs 18 serving to return the back rest to normal position and maintain the same yieldably in such position.

To attach the back rest to the seat of a farm machine it is only necessary that four holes be formed in the seat for the reception of the bolts or screws 15, and the forward ends of the springs.

What is claimed is:

A back rest for the seat of a farm machine or the like comprising upper and lower horizontal curved strips of different lengths and of different arcs of curvature, vertical connecting strips between the curved strips, downwardly and forwardly inclined side strips connected to the ends of the curved strips, hinged connections between the side strips and the seat of the machine, and springs connected to the side strips and to the seat forwardly of the said hinged connections.

In testimony whereof I affix my signature in the presence of two witnesses.

WILLIAM E. NICKLAUS.

Witnesses:
CLAUDE WEATHERFORD,
WILLIAM A. BOGGS.